United States Patent [19]
Jossic

[11] 3,974,765
[45] Aug. 17, 1976

[54] APPARATUS FOR CORRECTING THE WAY IN WHICH PRINT HAMMERS STRIKE

[75] Inventor: Alain Francois Jossic, Belfort, France

[73] Assignee: Compagnie Honeywell Bull (Societe Anonyme), Paris, France

[22] Filed: Jan. 14, 1975

[21] Appl. No.: 540,821

Related U.S. Application Data

[63] Continuation-in-part of Ser. No. 502,166, Aug. 30, 1974, abandoned.

[30] Foreign Application Priority Data
Sept. 5, 1973 France .............................. 73.32064

[52] U.S. Cl. ................................................ 101/111
[51] Int. Cl.² ............................................ B41J 9/26
[58] Field of Search ........... 101/92.06, 93.14, 93.20, 101/93.21, 93.26, 105, 111

[56] References Cited
UNITED STATES PATENTS

| | | | |
|---|---|---|---|
| 3,513,774 | 5/1970 | Pawletko | 101/93.14 |
| 3,575,107 | 4/1971 | McDowell | 101/111 X |
| 3,803,558 | 4/1974 | Jones | 101/93.14 X |

Primary Examiner—Harland S. Skogquist
Attorney, Agent, or Firm—Cameron, Kerkam, Sutton, Stowell & Stowell

[57] ABSTRACT

The disclosure describes a printer in which characters are moved past a sheet support on an endless belt. Hammers move from a rest position to a strike position in order to strike the characters against the sheet. The time at which the hammers are moved from their rest positions so that the characters can be accurately struck irrespective of belt speed variations by means of a strike correction circuit arrangement which includes a first sensor means positioned with respect to the endless belt for generating a synchronizing pulse in response to the movement of a reference indicator on the belt past a first predetermined position and a second sensor means associated with the endless belt for generating a check pulse in response to movement of another indicator means on the belt past a second predetermined location. A logic circuit generates a signal representing the deviation of the actual belt speed from the nominal belt speed in response to the time interval separating the synchronizing pulse and the check pulse. Actuation of the hammer is delayed proportionally to the value of the deviation signal.

11 Claims, 5 Drawing Figures

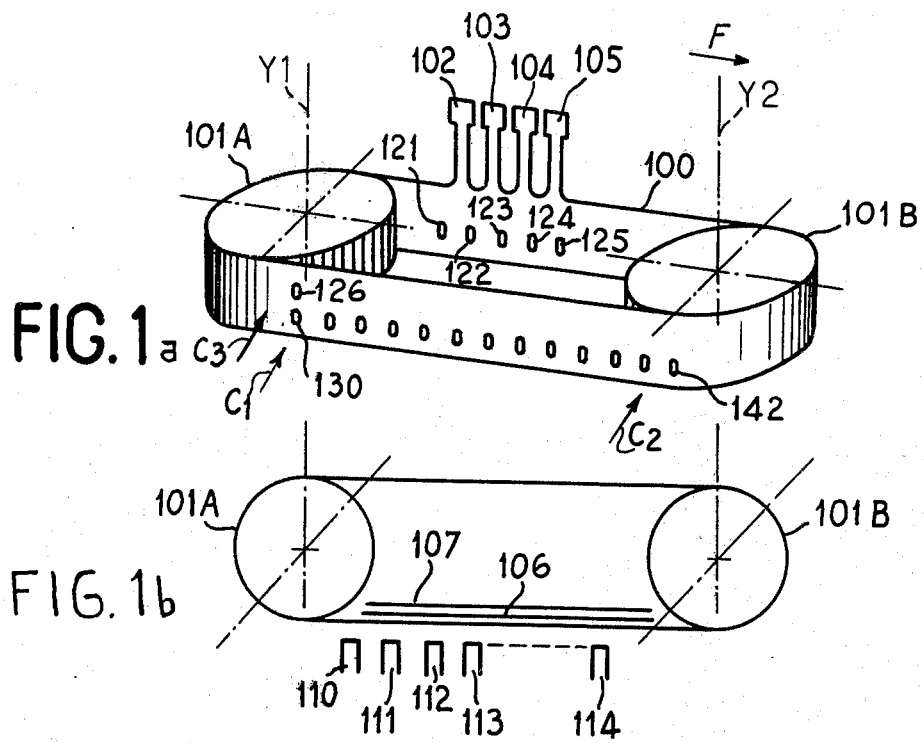
FIG. 1a
FIG. 1b
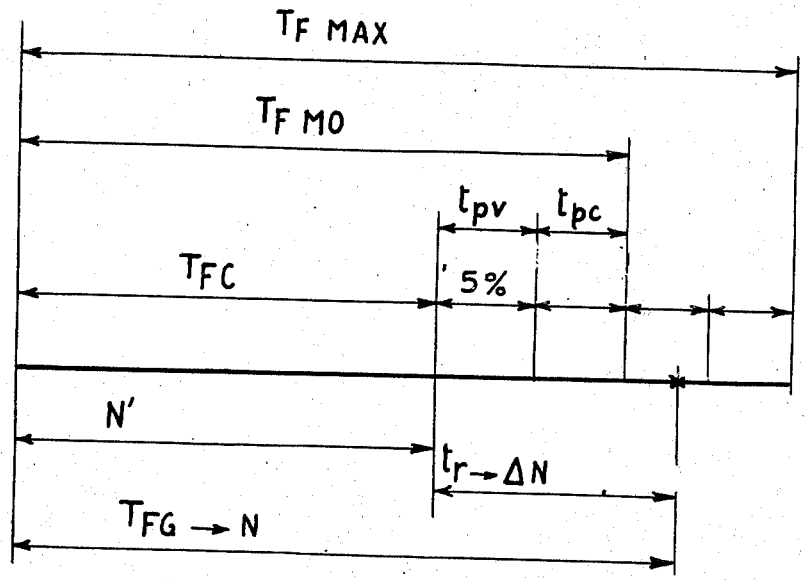
FIG. 4

APPARATUS FOR CORRECTING THE WAY IN WHICH PRINT HAMMERS STRIKE

RELATED APPLICATIONS

Priority is claimed under French Patent Application Ser. No. 73,32064, filed Sept. 5, 1973. This is a continuation-in-part of my now abandoned U.S. Application Ser. No. 502,166, filed Aug. 30, 1974, entitled "Apparatus For Correcting The Way In Which Print Hammers Strike".

BACKGROUND AND SUMMARY OF THE INVENTION

The present invention relates to an arrangement for correcting the way in which print hammers strike. In particular it is intended to correct for mis-alignment in impact printers which results from variations in the speed of the character support.

Modern impact printers have a character support (a rotary drum or a linear character support) which moves cyclically in front of a text or sheet support such that all the characters are made available at each print position.

At each print position there is a corresponding strike member which releases a print hammer at the required time, that is, when the character to be printed is at the appropriate print position.

This release is caused by the action on the hammer of an actuator, normally an electromagnetic or electrodynamic actuator, which is operated by a strike amplifier.

Although their performance is similar from the point of view of printing speed, printers having a linear support are preferred to drum printers at the present time because of the better standard of print they give.

Among linear supports, endless type-carrying belts are well known. Such a belt is described, for example, in French Pat. No. 1,602,392 which was filed on Nov. 19, 1968 corresponding to U.S. Pat. No. 3,844,211. This belt is a metal one, made of steel, which is tensioned over two pulleys having parallel axes of rotation and which is provided on its top edge with N type-carrying fingers in the form of flexible tongues, the entirety of these N fingers consisting of a whole number of identical sets of different characters.

The belt passes horizontally before the text support and the group of strike members with a uniform linear motion. Along the bottom edge it has a line of N synchronization holes, each of these holes being associated with one and only one of the N characters. At a level different from that of the N holes is situated another synchronizing hole known as the start-of-belt hole which corresponds to one particular character among the N characters, such as the first in the series of characters making up one of the aforementioned sets.

With the line of N holes is associated a first sensor (magnetic or opto-electronic) which is connected to the framework of the printer and which gives a signal each time a hole, and thus a character, passes in front of it. This signal is amplified and shaped and is transmitted to the logic unit which controls the printing of the printer.

A second sensor, which is likewise connected to the framework of the printer, is associated with the "start-of-belt" hole and gives a signal each time the latter passes in front of it. The signal, once amplified and shaped, is also transmitted to the logic unit of the printer.

Combining the N signals transmitted by the first sensor with the signal from the second sensor makes it possible to locate any of the characters with certainty, that is, it is always known which character-carrying finger is passing in front of a particular hammer.

To make allowance for the response time of the strike members, it is necessary for a certain length of time to elapse between the moment at which each synchronizing hole is picked up and the moment at which the hammer actually strikes the character which corresponds to this hole. To this end:

1. the axis of symmetry of each synchronizing hole is equidistant from pairs of successive fingers; and
2. each strike amplifier has in series with it a monostable circuit termed a "delay" circuit.

When a hole has been picked up by the logic unit of the printer and the corresponding character needs to be struck by the hammer which is in coincidence with the character, the logic unit gives an order to the monostable circuit which then emits a so-called delay pulse of adjustable duration $td$. When this pulse drops to logic zero, the strike amplifier associated with the hammer provides the hammer with the energy needed for it to strike. Duration $td$ depends on the strike time, i.e., the interval which elapses between the time at which the logic unit of the printer gives the order to strike and the time at which the hammer effectively strikes the character.

Duration $td$ of the delay pulse is adjusted so that the strike time is the same for all the hammers (this operation is termed "alignment of the hammers"), and this duration is a function of the performance required from the printer and thus of the speed of the belt.

The pulleys on which the belt is mounted are driven by motors having a rotational speed subject to variations in the supply or mains voltage. If the delay times (and thus the strike times) have been adjusted for only a single belt speed, any variation in the belt speed upsets the striking action and results in mis-alignment of the print. The characters are struck too early or too late and this detracts from the quality of the print.

To remedy this state of affairs, there are a number of solutions in current use. When the drive is by means of synchronous motors, an associated inverter is used. When the motors are DC, they are regulated directly.

However, these solutions are cumbersome and expensive and still allow variations in speed which remain troublesome.

The present invention makes it possible to overcome these drawbacks by advancing or retarding the time at which the monostable delay circuit produces the delay pulse depending on whether the speed decreases or increases. The delay time is increased or reduced in this way, and the strike time of the hammers is adjusted in the most favorable way as a function of the changes in the speed of the belt.

A correcting arrangement made in accordance with the invention can be used with an impact printer which has a linear character support. The support moves at a nominal speed V past a text or sheet support and is provided with the same number of synchronizing reference-points as there are characters. A fixed detector which detects the reference-points is arranged close to the path followed by them and produces a so-called synchronizing pulse each time a reference-point passes in front of it. The printer also has a strike hammer responsive to a synchronizing pulse for moving from a rest position to a strike position in contact with a predetermined character on the sheet.

When used with such a printer, a preferred form of the invention would include means for generating a deviation speed signal representing the deviation of the actual carrier speed from the nominal speed. Strike means are provided for moving the strike hammer from the rest position to the strike position in response to a strike pulse. The strike means typically could include a monostable multivibrator which pulses a strike amplifier that releases the strike hammer. Delay means apart from the multivibrator generate the strike pulse after a delay time period proportional to the value of the deviation speed signal, said delay time period commencing with the receipt of the synchronizing pulse by the delay means. By using this apparatus, the strike hammer will strike the character at the proper time irrespective of carrier speed variations.

In accordance with other more detailed features of the invention, the correcting arrangement comprises:

a second fixed detector (C) for detecting the reference points located at a distance from the first detector equal to an odd number of half inter-character spaces. The second fixed detector generates a check pulse each time a reference point passes in front of it;

a logic correcting circuit associated with the two detectors comprising:

a first time-base clock;

a circuit for measuring overall strike time;

a subtractor circuit;

a register;

a downwards counter; and a second time-base clock associated with the downwards counter.

Chronologically, the logic correcting circuit operates as follows:

the measuring circuit receives at a first input the synchronizing pulse, at a second input the check pulse corresponding to the same reference point and at a third input the pulses supplied by the first time-base clock;

during the time interval separating the synchronizing and check pulses, the logic correcting circuit calculates the number N of pulses equivalent to the actual strike time relative to the actual speed of the character support, this actual strike time being equal to the product of N multiplied by $h$, $h$ being the period of the pulses supplied by the second time-base;

finally the logic correcting circuit transmits an actual speed signal corresponding to the number N to the subtractor circuit as soon as the check pulse is received.

The subtractor circuit calculates the difference N between N and N', which is the number of pulses equivalent to the strike time relative to the nominal speed of the said support and is equal to the product of N' multiplied by $h$. In other words, N' corresponds to the nominal speed of the support.

This difference N is a deviation signal which is transmitted to the register and then to the downwards counter. The downwards counter receives at a first input the synchronizing pulse and at a second input the pulses of period $h$ from the second time-base, and allows the synchronizing pulse to be transmitted to the delay generator after a time tr which is equal to the product of ΔN multiplied by $h$.

DESCRIPTION OF THE DRAWINGS

The invention will be better understood from the following description of a preferred embodiment of the invention which refers to the accompanying drawings in which:

FIG. 1a is a schematic perspective view of one embodiment of the character support of a printer in which striking is corrected as a function of variations in speed by a preferred embodiment of the invention;

FIG. 1b is a schematic top plan view of the apparatus shown in FIG. 1a;

FIG. 3 is a graphic representation, as a function of time, of the respective trajectories of the fingers and of a hammer of the printer shown in FIG. 1a; and FIG. 4 is a diagram showing the definitions adopted as a convention for the minimum and maximum strike times.

DESCRIPTION OF THE PREFERRED EMBODIMENT

Figure 2:
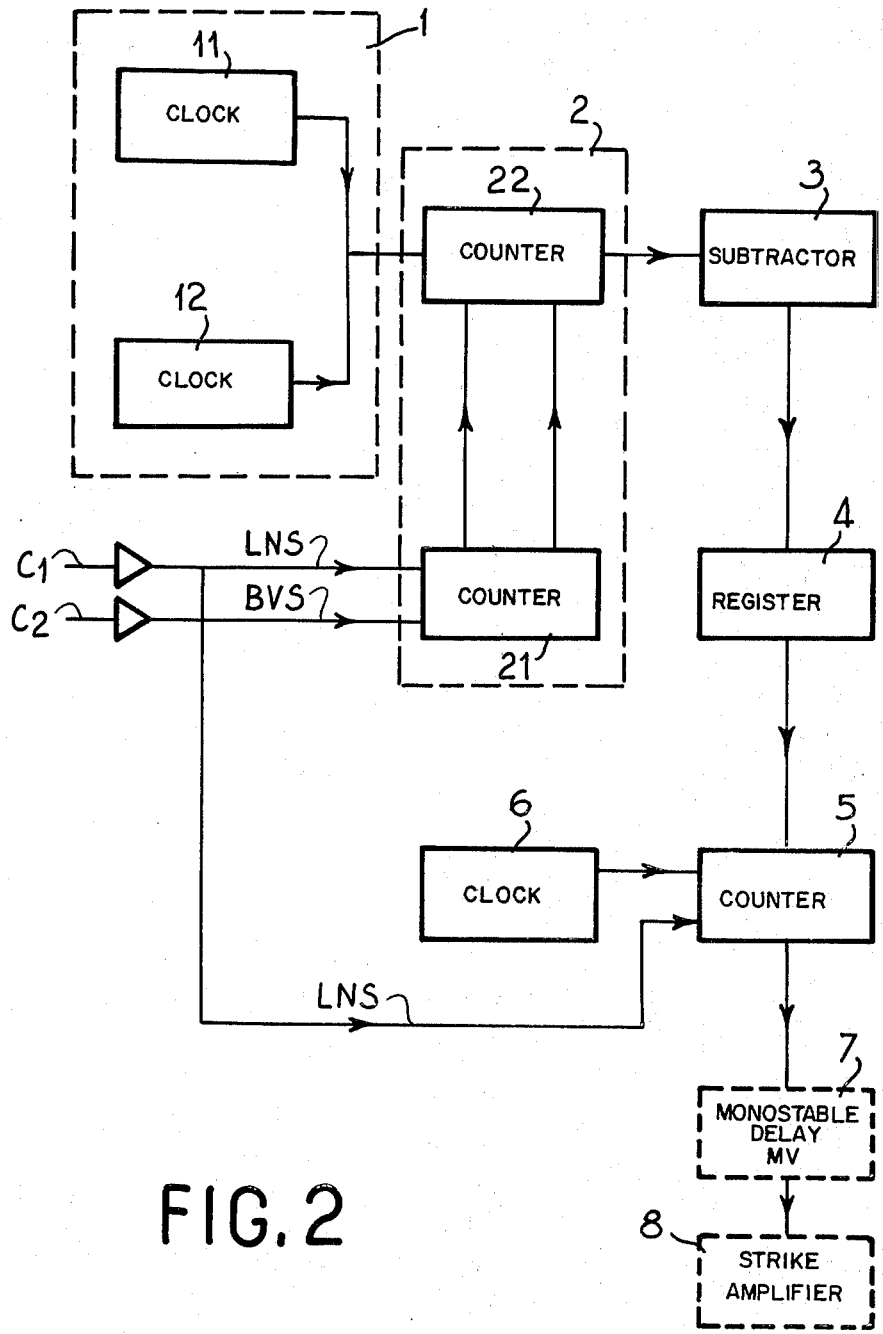
FIG. 2 is a block diagram of a preferred form of logic and control circuitry made in accordance with the present invention.

The invention will be better understood if one recalls the principles on which a printer having a type-carrying belt is constructed and operates.

The belt 100 is shown mounted in the printer on two pulleys 101A and 101B, the axes Y1 and Y2 of which are vertical. To make FIG. 1a easier to understand, only part of the belt 100 is shown with its character-carrying tongues 102 to 105. The tongues are deliberately shown overlarge in relation to the belt 100 so as to make FIG. 1a clearer.

In the same way, hammers 110 and 114 are shown, very schematically, in FIG. 1b. The endless belt 100 moves linearly at constant speed between hammers 110 and 114 on the one hand and the text or sheet support 106 and an anvil 107 on the other.

The speed of the belt 100 is adjustable and depends on the printing speed required from the printer. Fingers 102 to 105 are associated with synchronizing holes 122 to 125 respectively, in such a way that one and only one synchronizing hole corresponds to each finger.

As an example, the synchronizing holes may be situated between the type-carrying fingers, as shown in FIG. 1a. Thus, hole 122 is situated between fingers 102 and 103, hole 123 between fingers 103 and 104, etc. If belt 100 moves in the direction of arrow F, as indicated in FIG. 1a, hole 122 is associated with finger 102, hole 123 with finger 103, and so on.

For reasons which will become clearer later, a certain number of synchronizing holes 130 to 142 are shown on the front face of the belt in FIG. 1a.

This belt 100 also contains a special synchronizing hole 126 termed a "start-of-belt-hole" which is situated at a different level from the line of synchronizing holes.

With the line of synchronizing holes is associated a sensor C1 termed the synchronizing sensor (shown symbolically by an arrow) which gives a synchronizing pulse LNS each time a synchronizing hole passes in front of it, this pulse being transmitted to the strike-controlling logic circuits of the printer.

The start-of-belt hole 126 has associated with it a sensor C3 which gives a pulse when the hole in question passes in front of it, this pulse too being transmitted to the logic circuits.

By combining the two signals transmitted by sensors C1 and C3 it becomes possible, in a known way, using the logic circuits, to locate any of the synchronizing holes and thus any of the fingers. Since the geometric relationship between the sensors, the hammers and the fingers is known, a strike order can be given to print any desired character on the belt.

In accordance with the invention, a second sensor C2, identical with the first two, is arranged at the same level as the synchronizing holes (in the same way as C1) at a distance from sensor C1 equal to an odd number of half-intervals between characters. In a particular embodiment of the invention, this distance is equal to 25 half intervals, i.e., 12.5 intervals. Sensor C2 produces a BVS pulse each time a synchronizing hole passes in front of it.

A preferred arrangement according to the invention is shown in the form of a block diagram in FIG. 2. Since the arrangement operates in exactly the same way for every hammer, the subsequent explanation will deal with only a single hammer.

FIG. 2 illustrates various constituent parts of the preferred arrangement according to the invention, namely:
    sensors C1 and C2;
    a first adjustable-frequency clock 1;
    a circuit 2 for measuring overall strike time, including counters 21 and 22;
    a subtractor circuit 3;
    a register 4;
    a downwards counter 5; and
    a second frequency clock 6.

This correction circuit controls the monostable delay unit 7 and the strike amplifier 8 for the hammer in question, (110 for example).

Figure 3:
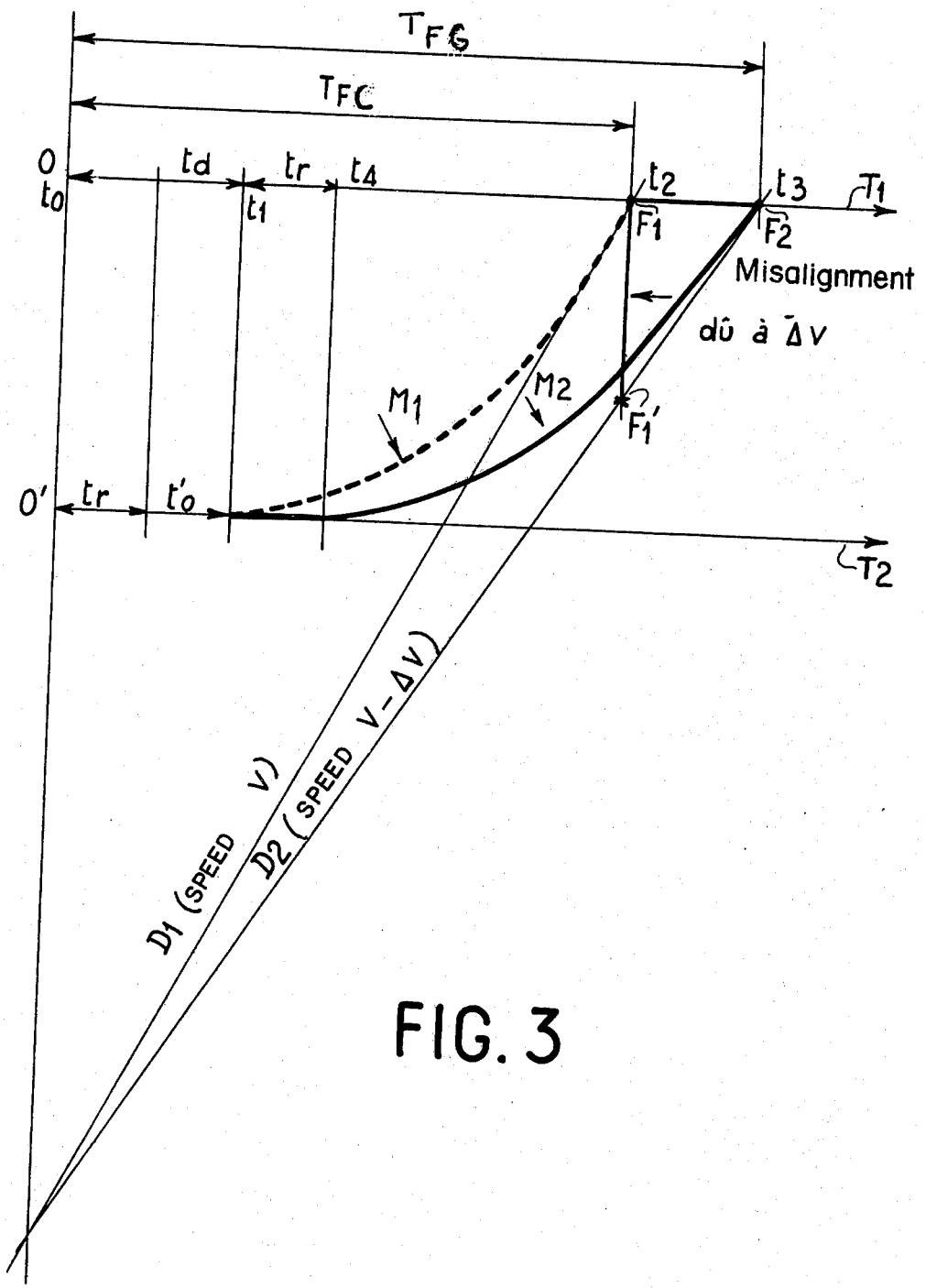

So that the principle on which the present arrangement operates may be understood, it is necessary to review the way in which a hammer functions during a strike, this being illustrated in FIG. 3.

When an LNS synchronizing signal is emitted, the strike-controlling logic circuits actuate the monostable delay circuit 7 for the hammer in question. This monostable circuit 7 supplies, beginning at time $to$, a pulse equivalent to logic 1 of duration $td$ (delay time). When this pulse returns to logic 0 at time $tl = (to + td)$, it actuates the strike amplifier 8 which supplies energy for a strike to the strike module. The hammer is then set in motion and describes a trajectory M1 (FIG. 3.) During this time, the finger to be struck by the hammer is describing a trajectory D1, moving at the nominal speed V of the belt. The hammer strikes the finger in question at time $t2$ at the point F1 where the two trajectories M1 and D1 intersect along the time axis OT1.

There will now be considered the case where the belt suffers a reduction in speed $\Delta V$. Its speed is now $(V - \Delta V)$. The finger in question describes a trajectory D2. 1 hammer therefore strikes the finger at point F′1 at time $t2$. Length F1 to F′1 represents the misalignment due to the variation in speed $\Delta V$. It is clear that the hammer will strike only a part of the finger and that, as a consequence, the finger will improperly print on the text support.

For the print to be good, it is necessary for the hammer to strike the finger at point F2 at time $t3$ (representing the point where line D2 intersects the time axis OT1). Consequently the trajectory of the hammer needs to be altered. For this there are two possible solutions:

a. the delay pulse may be lengthened by a time $tr = (t3 - t2)$ so that a new delay time $t'd$ is obtained which equals $td + tr = td + (t4 - t1)$ where $(t4 - t1) = (t3 - t2)$.

b. the time $to$ at at which the monostable circuit 7 gives a pulse may be delayed. This time becomes $t'o = (to + tr)$ (shown on the auxiliary time axis O'T2).

It is the second solution which is adopted in practice. The object of the arrangement is thus:
    1. to calculate the delay time $tr$; and
    2. to delay the time at which the delay pulse emitted by the monostable delay circuit 7 is triggered.

Before beginning to described the way in which the arrangement operates, some new standard strike times will be defined:

a. the standard strike time $TFC = t2 - to$ (see FIG. 3).

This strike time, which depends on the physical, mechanical and electrical characteristics of each hammer, is fixed for good and can in no case be altered.

b. the mean strike time TFMO

This time TFMO is equal to $TFC + tpv + tpc$, where $tpv$ is the margin of error of the strike time resulting from variations in the speed of the belt (due to the characteristics of the system driving the pulleys) and $tpc$ is the margin of error of the strike time resulting from inaccuracies in the geometrical setting up of the sensor (C2), the position of the sensor being such that at speed V, the strike time of a hammer is effectively the same as the mean strike time TFMO.

c. the minimum strike time TFMin which in practice is equal to TFC.

d. the maximum strike time $TFMax = TFMO + tpv + tpc$.

The arrangement illustrated in the drawings operates as follows:

Let the speed of the belt be different from V and equal to $V - \Delta V$. When a first synchronizing hole, for example, hole 130, passes in front of sensor C1, the latter emits a first synchronizing pulse LNS which is transmitted to counter 21 of measuring circuit 2. In response to the first LNS pulse, counter 21 enables counter 22 to receive pulses from clock 1 and prevents any BVS pulses from being transmitted to counter 22. After counter 21 has received 13 LNS pulses, the next BVS pulse is gated to counter 22 as a check pulse. That is, the BVS check pulse generated by the passage of hole 130 in front of sensor C2 is gated to counter 22. In response to the BVS pulse generated by hole 130, counter 22 stops counting pulses from clock 1, transfers the accumulated count to subtractor circuit 3 and is reset to 0. In response to the fourteenth LNS pulse, the BVS pulses are again prevented from being transmitted to counter 22, and counter 22 again begins to count pulses from clock 1. In other words, BVS check pulses are transmitted through counter 21 to counter 22 only between every 13th and 14th LNS pulses. The frequency dividing and gating circuitry of counter 21 required to achieve this mode of operation would be obvious to those skilled in the digital electronic arts.

The interval of time which elapses between the LNS pulse and the BVS pulse produced by the same synchronizing hole is termed the measuring time Tm.

During time Tm counter 22 in the measuring circuit counts N pulses from clock 1 which are equivalent to the actual overall strike time TFG for the hammer. If $h$ is the period of the pulses from the second clock 6, $N \times h$ must equal TFG. It is therefore clear that the frequency of the pulses from the adjustable clock 1 will have been adjusted in such a way that during time Tm (the time taken by the belt 100 to move a distance equivalent to 12.5 character intervals) the number of pulses N is indeed such that N × h = TFG. In other words, the number of pulses N counted by the circuit 2 is proportional to the speed of the belt 100.

At the conclusion of measuring time Tm, the number N is transmitted by the measuring circuit to the subtractor circuit which subtracts a number N' of pulses such that N' × h = TFC (Standard/strike time). At the output of the subtractor circuit are received a number of pulses ΔN = N − N' such that ΔN × h = tr (see FIG. 4). This number ΔN is transmitted to the register 4, which in turn, transmits the number to the downwards counter 5. At a first input, counter 5 receives a series of pulses from the second clock 6 and counts down for a length of time equal to ΔN × h, i.e., tr. At a second input, counter 5 receives the signal LNS from sensor C1. Once the number of pulses generated by clock 6 has reached ΔN, signal LNS is allowed through and is transmitted to the monostable delay circuit 7 with a delay tr. This circuit thus in fact gives the delay pulse with a delay of tr.

The adjustable frequency clock 1 comprises:
a settable clock 11; and
an adjustable clock 12.

The settable clock 11 emits a fixed number of pulses Nf such that Nf × h is slightly less than the standard strike time. Clock 11 comprises a quartz crystal oscillator and a frequency divider. This clock delivers pulses at a rate which is not continuously variable in a precise manner. To obtain pulses at a precise and variable rate, an adjustable analogic clock 12 is used. This clock permits a continuous variation in the rate at which it produces pulses. The adjustable clock 12 supplies a number of pulses lying between two numbers A and B such that A = (Nmax − Nf) and B = (Nf − Nmin) where Nmax and Nmin represent the numbers of pulses which are equivalent to the maximum strike time TFMax and the minimum strike time TFMin respectively and are such that NMax × h = TFMax
NMin × h = TFMin For example, if 1022 pulses per second are desired from clock 1, settable clock 11 is set to produce 1000 pulses per second and adjustable clock 12 is adjusted to produce 22 pulses per second.

As previously described, circuit 2 for measuring strike time comprises:
a counter 21 for counting LNS pulses; and
a counter 22 for counting the pulses supplied by the first clock.

The counter for counting the LNS pulses generates signals to instruct the pulse counter 22 to stop and start. When the first LNS signal is received, counter 21 allows counter 22 to count the pulses supplied by clock 1 until signal BVS arrives. The latter then stops counter 22 from counting. In the interval between signal BVS (equivalent to 12.5 LNS) and the thirteenth LNS signal, number N is transmitted to subtractor 3 and number ΔN = N − N' is transmitted to register 4. When the thirteenth LNS signal arrives, the cycle of operation is repeated as before.

To sum up, over a period of time the successive cycles of correcting operations progress as follows. First to be considered is an initial cycle C1 of thirteen LNS signlas. During this cycle C1, the correcting arrangement calculates a correction of ΔN pulses equivalent to a delay tr1. During the cycle C2 of thirteen LNS signals which is immediately after cycle C1 in time, the correcting arrangement applies the delay tr1 (equivalent to N1) to the monostable delay circuit 7 while it calculates a new delay tr2 (which is usually different from tr1) equivalent to ΔN pulses, and so on. In broad terms, during a cycle Ci, the correcting arrangement applies a delay tr (i − 1) to the monostable delay circuit 7 while it is calculating a new delay tr(i) which will be applied to the monostable circuit 7 in the next cycle (Ci = 1).

In a modification of the invention, the subtractor circuit 3 is done away with and the counter 22 then performs the function of this circuit.

The counter in question is preset to the value −N'. Since it counts N pulses during the measuring time Tm, at the end of this time it will contain the value N − N' + ΔN, which is then transmitted to register 4.

The preferred embodiments may be altered without departing from the true spirit and scope of the invention as defined in the accompanying claims.

What is claimed is:

1. In a strike connection circuit arrangement for an impact printer comprising a carrier for moving a character past a sheet support at a nominal speed, reference indicator means for identifying the location of the character on the carrier, first sensor means associated with said carrier for generating a synchronizing pulse in response to the movement of the reference indicator means past a first predetermined location, at least one strike hammer adapted to be energized from a rest position to a strike position in contact with the character to effect a print out of the character on the sheet while the carrier is moving, control circuit means operably connected to said strike hammer for controlling the energization thereof including a logic unit responsive to said synchronizing pulse, a delay generator connected to said logic unit for generating a delay pulse in response to said synchronizing pulse and a strike amplifier responsive to said delay pulse for controlling the energization of said strike hammer, the improvement comprising:

second sensor means associated with said carrier for generating a check pulse in response to movement of said indicator past a second predetermined location, circuit means for generating a deviation signal representing the deviation of the actual carrier speed from the nominal carrier speed in response to the time interval separating said synchronizing pulse and said check pulse, and said delay generator being responsive to said deviation signal to thereby control the time in which the delay generator generates said delay pulse, said time being proportional to the value of the deviation signal, and said time of generation commencing with the receipt of the synchronizing pulse by the delay means.

2. A strike correction circuit arrangement as set forth in claim 1 wherein the character support is an endless type-carrying belt tensioned over two pulleys.

3. A strike correction circuit arrangement as set forth in claim 1 wherein said circuit means for generating a deviation signal includes a first clock, an overall strike time measuring stage connected to receive the output of said clock, the synchronization pulse and the check pulse for calculating during the time interval separating the synchronization pulse and the check pulse the number of pulses N equivalent to the actual strike time as dictated by the actual speed of the sheet support and the difference $\Delta N$ between N and N' where N' is the number of pulses equivalent to the strike time relative to the nominal speed of the support.

4. A strike correction circuit arrangement as set forth in claim 3 further including a second clock, a counter connected to said measuring stage and adapted to receive therefrom a signal corresponding to $\Delta N$, said counter having a second and third input, means for connecting at the second input the output of said clock and at the third input the synchronizing pulse to thereby allow said synchronizing pulse to be transmitted to the delay generator.

5. A strike correction circuit arrangement as set forth in 4 wherein said synchronizing pulse is transmitted to the delay generator after a time $t_r$ equal to the product $\Delta N$ and h, where h is the period of the pulses supplied by the second clock.

6. In a strike correction circuit arrangement for an impact printer comprising a carrier for moving a character past a sheet support at a nominal speed, reference indicator means for identifying location of the character on the carrier, first sensor means associated with said carrier for generating a synchronizing pulse in response to the movement of the reference indicator means past a predetermined location, at least one strike hammer adapted to be energized from a rest position to a strike position in contact with a character to effect a print out of the character on the sheet while the carrier is moving, amplifier strike means for energizing the strike hammer, control circuit means operably connected to said amplifier means for controlling the energization thereof including a logic unit and a delay generator connected for generating a delay pulse in response to said synchronizing pulse, said strike amplifier being connected to the output of the delay generator and responsive to said delay pulse for controlling the energization of said hammer, the improvement comprising second sensor means associated with said carrier for generating a check pulse in response to movement of the indicator means past a second predetermined location, logic circuit means having a first and a second input, said first input being connected to said first sensor means for receiving said synchronizing pulse, said second input being connected to said second sensor means for receiving said check pulse and said logic circuit means having an output connected to said delay generator to thereby control the time at which the delay generator produces the delay pulse as a function of the speed of the belt.

7. A strike correction circuit arrangement as set forth in claim 6 wherein said logic means includes a first clock for generating a series of pulses, an overall strike time measure stage connected to receive said series of pulses for calculating during the interval separating the synchronization pulse and the check pulse the number of pulses N which is equivalent to the actual strike time as dictated by the actual speed of the support, a second clock for supplying a series of pulses each having a period h, the actual strike time being equal to the product of N multiplied by $h$, a subtraction circuit connected to receive the pulses N upon receipt of the check pulse at said second input, said subtraction circuit being arranged to calculate the difference $\Delta N$ between N and N', N' being the number of pulses equivalent to the strike time relative to the nominal speed of said support, which is equal to the product of N' multiplied by $h$, a register connected to receive the pulses corresponding to the difference $\Delta N$, a downwards counter connected to receive the output of the register, said downwards counter having as additional outputs the output of said second clock and a synchronizing pulse, said synchronizing pulse being transmitted to said delay generator through said counter, said synchronizing pulse being transmitted after a time $t_r$ equal to the product of $\Delta N$ multiplied by $h$.

8. A strike correction circuit arrangement as set forth in claim 7 wherein said first clock includes a settable clock and an adjustable clock connected in parallel, the settable clock supplying a fixed number of pulses and the adjustable clock supplying an additional number of pulses which may vary between a lower limit and an upper limit.

9. A strike correction device as claimed in claim 7 wherein the strike time measure stage comprises a first and a second counter, the first counter being arranged to enable the second counter to count pulses supplied by the first clock when it receives a synchronizing pulse and preventing said first counter from so counting when it receives the check pulse.

10. A strike correction circuit arrangement as set forth in claim 7 wherein the strike time measure stage and a subtraction circuit are formed by one and the same counter, said counter being preset to a negative value equal to $(-N')$.

11. A strike correction circuit arrangement as set forth in claim 6, wherein the character support is an endless type-carrying belt tensioned over two pulleys.

* * * * *